UNITED STATES PATENT OFFICE.

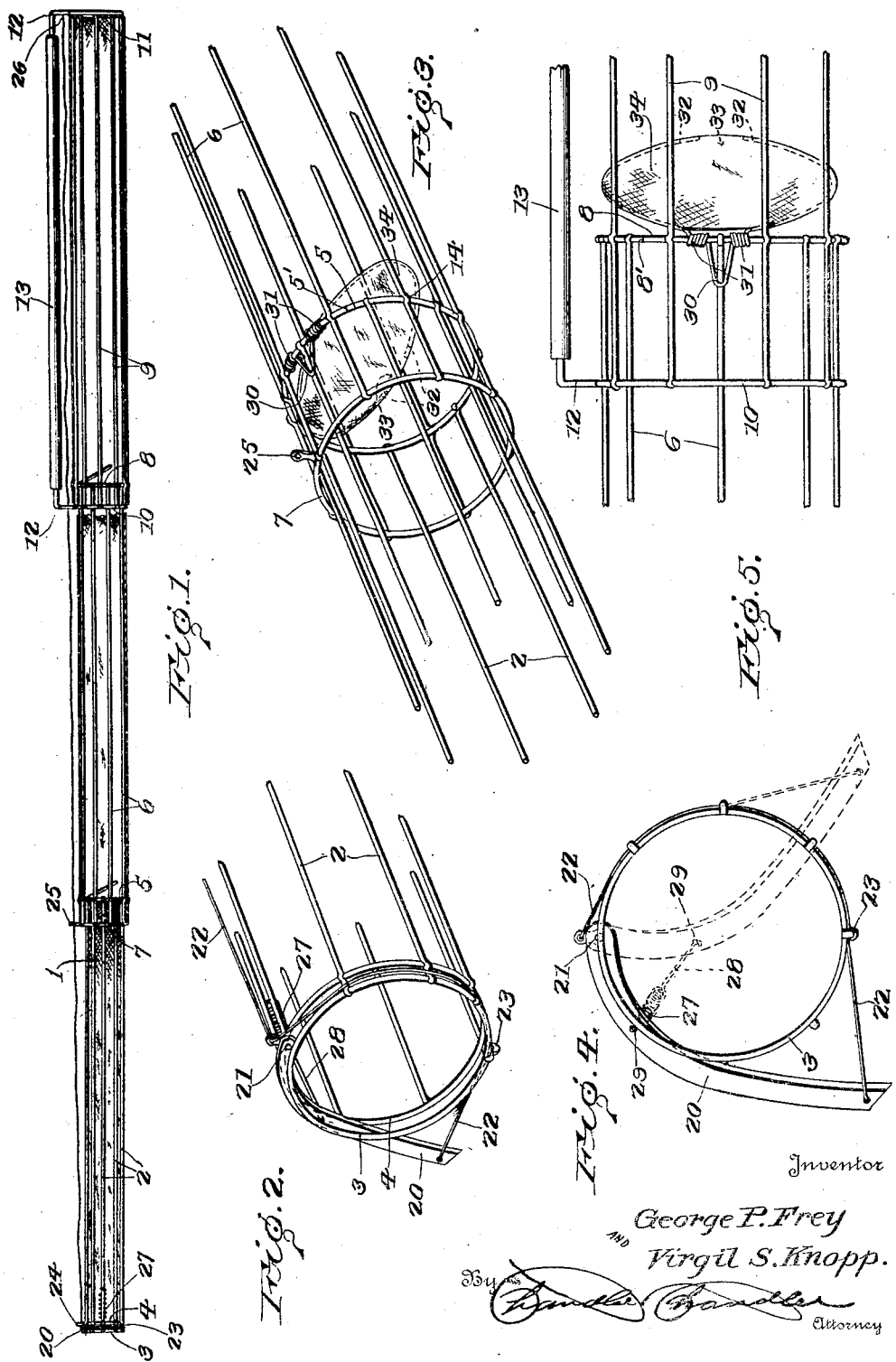

GEORGE P. FREY AND VIRGIL S. KNOPP, OF PARKERSBURG, WEST VIRGINIA.

FRUIT-PICKER.

1,368,496.         Specification of Letters Patent.     Patented Feb. 15, 1921.

Application filed September 10, 1920. Serial No. 409,332.

*To all whom it may concern:*

Be it known that we, GEORGE P. FREY and VIRGIL S. KNOPP, citizens of the United States, residing at Parkersburg, in the county of Wood, State of West Virginia, have invented certain new and useful Improvements in Fruit-Pickers; and we do hereby declare the following to be a full, clear, and exact description of the invention, such as will enable others skilled in the art to which it appertains to make and use the same.

This invention relates to fruit gatherers, and more especially to those of that type in which a piece of fruit such as an apple has its stem cut with a knife, after which the fruit travels down a chute to a receptacle carried by the operator.

The primary object of the invention is to make the device in a number of tubular sections which may be telescoped into each other to reduce space when the article is not in use and so it can be used partially or totally extended or collapsed as is most convenient to reach the fruit to be picked.

Another feature is to provide baffles along the line of the chute so as to retard the speed of the falling fruit and prevent injury thereof.

Another feature is to provide improved means for automatically latching the sections in distended condition.

Details are set forth below and shown in the drawings wherein:

Figure 1 is an elevation of the fruit picker, the fabric covering being in section so as to disclose the inner frame.

Fig. 2 is a perspective view of the cutter end of the frame.

Fig. 3 is a perspective view of the slidably connected end portions of a pair of sections with a baffle.

Fig. 4 is an end view of the cutter mechanism and adjacent parts of the frame.

Fig. 5 is an enlarged elevation of connected end portions of two sections with a baffle.

The fruit picker herein is shown as made up of three sections only, although there could be a greater or less number. With three sections about five feet long each and lapping each other as far as necessary, the entire tool will approximate fifteen feet in length which is sufficient for fruit trees of average height; and the bore of the smallest section will of course be ample to permit the passage of the largest piece of fruit. The sections are tubular, being shown herein as made up of eight longitudinal wires with rings at their ends, and the gage of the wires and rings should be such as to preserve lightness while maintaining the necessary rigidity. The lower or bottom rings of the joints, *i. e.*, the rings to be inserted within the top rings of joints below, should be of wire sufficiently rigid to maintain its circular form without being solid all around, but having the ring cut with the ends just meeting. This will allow the ring to be sprung together in order to insert it into the ring at the top of the joint below, when it will immediately spring out, making a sliding fit within the structure of this joint. Thus the smaller joint will not by accident slip out of the end of the larger joint and the end of the joint may by this means be adjusted to preserve the fit. A larger number of wires may be used without any lining, or a smaller number of wires with an internal lining 1 of canvas or suitable fabric. This lining is shown at some places and omitted at others. The uppermost and smallest section is made up of rods 2 connected at their upper ends by two slightly spaced rings 3 and 4 and at their lower ends by a single ring 5 split at 5′; and if the lining is used it is inclosed within the cage like structure thus formed and attached to the rods and rings in any suitable way. The next section is made up of rods 6 connected at their upper ends to a ring 7 which is sufficiently large to inclose and to slide upon the rods 2, and connected at their lower ends by a ring 8, also split at 8′. The lower or base section is likewise made up of rods 9 connected at their upper ends by a ring 10 which incloses the rods of the second section and at their lower ends by a ring 11 through which the fruit finally falls into a receptacle, and this lower section may have brackets 12 outstanding from one side thereof and carrying a handle 13 of wood or the like. By preference the lower section is the longest for convenient storage and in order that baffles will not conflict when the tool is being used while collapsed. The other sections decrease in length upward of the tool, so that when the same is collapsed the sections may be all housed within the lower section for convenient storage. Referring now to Fig. 3 it will be seen that the rods 6 near their upper ring 7 are crimped outward as shown at 14, the crimps occurring in a plane spaced slightly from that occupied by the upper ring 7, and therefore when the first and second sections are distended, the ring 5 sliding within the rods will eventually snap into the crimps to hold them distended. Although not specifically illustrated, the same means may be employed to hold the intermediate and handle sections distended. This will be found sufficient to sustain the tool against collapse but yet the operator may forcibly collapse it whenever he desires.

The numeral 20 designates a blade or knife pivoted at 21 to the upper ring 3 of the upper section, and adapted to be swung across this ring by means of a cord 22 which is connected with the knife, passed through suitable guides at the points 23 and 24 in said ring and then along outside this section and through guides or eyes 25 on the upper ring of each remaining section, being finally led along the handle section and attached thereto at 26. When the operator draws on this cord, the knife will swing inward and cut the stem of the fruit. A spring 27 is attached at one end to one of the rods 2 of the upper section and a flexible wire 28 leads from its other end through a guide 29 on the outer ring behind the knife, and is attached to the latter. When the cord is drawn on to swing the knife inward, the wire is put under tension and the spring expanded; when the cord is relaxed the contraction of the spring restores the knife to the position shown in Fig. 4.

An important feature of the invention is the means for checking the too rapid travel of the fruit down the tubular structure thus built up. This consists in providing baffles throughout its length, preferably at points where the sections lap each other, and the construction of a baffle is well illustrated in Fig. 5. Here a fine piece of spring wire is shown as bent at its center 30 where it crosses one of the rods 2, then extended into coils 31 surrounding the lower ring 5 of the upper section, then spread into curved legs 32 bowed outwardly from each other and making up most of a circle although their extremities are disconnected and spaced from each other at the point 33; and to the spring wire frame thus formed is attached a piece of light fabric 34 as by hemming its edges around the legs 32. The disposition of the coils 31 is such as to cause this baffle normally to stand across the upper tubular member or section like a valve closing it, as seen in full lines in Fig. 1, but when an apple travels down this section it will strike the cloth 34 and swing the baffle downward and aside so as to check but not wholly impede its passage, the apple slipping off the free edge of the baffle when the latter swings open far enough. Thence it passes on its way, is baffled again at a lower point, and if desired is baffled yet again before it drops out of the handle section into the bag or basket, each baffle returning immediately to its normal position for subsequent service.

The operator may carry this tool in its collapsed condition to the point of use, the string or cord 22 being at this time wrapped around the lower section and its handle 13. Now he unwraps or loosens the cord and then distends the sections so that the tool appears as shown in Fig. 1. Raising it to an upright position, he passes the uppermost ring of the upper section around a piece of fruit from below and pulls on the cord. The knife swings as shown in dotted lines in Fig. 4 and cuts off the stem, and the fruit falls into the receptacle as described. While I have spoken of picking apples and the like with this tool it will be clear that it could be used on any fruit which grows beyond the reach of a person standing on the ground, such as apples, oranges, peaches and fruit of a like nature.

Manifestly the use of a tubular lining as suggested would tend to keep ripe and tender fruit from contact with the rods and rings, and what little weight it added would be offset by the fact that when the lining was used possibly four rods would be sufficient. This detail may be left to the manufacturer, but care should be taken that the lining for each section is attached to its rings in such manner as not to interfere with the collapsing and distention of the structure or with the action of the baffles and the knife.

What is claimed is:

1. In a fruit picker, the combination with one section including longitudinal rods connected by a ring; of a second section also including rods connected by a ring, the ring of each section slidably engaging the rods of the other, the rods of one section having crimps adapted to spring into engagement with the ring of the other when the sections have been distended until their rings are contiguous, and cutting mechanism carried at the free end of one of said sections in position to deliver thereinto.

2. In a fruit picker, the combination with one section including longitudinal rods and a ring standing in a transverse plane and attached to the extremities of the rods; of a second section including longitudinal rods passing outside the first ring, a ring standing in a transverse plane and encircling the first set of rods and connected to the ends of the second set, in the outer set of rods having outstanding crimps disposed in a plane slightly spaced from its ring and adapted to snap into engagement with the ring of the first set when the two sections are distended, and cutting mechanism carried at the free end of one of said sections in position to deliver thereinto.

3. The herein described fruit picker made up of a plurality of sections telescopically mounted one within another and each comprising end rings connected by a plurality of rods, a fabric lining within each section, means for holding the sections distended but permitting their collapse, and cutting mechanism on the upper section.

4. The herein described fruit picker composed of a tubular staff, cutting mechanism at its upper end, and baffles within its length, each consisting of a spring wire bent into a substantially circular frame and into coils surrounding an element of the staff whereby the frame is held normally in position across said staff but permitted to yield under impact of a piece of falling fruit, and a soft covering across said frame.

5. In a telescopic fruit picker, the combination with a body made up of sections, each composed of longitudinal rods and rings connecting them at the ends of the section; of a baffle at the lower end of each section, the same composed of a piece of spring wire bent at its center to overlie one rod, then formed into coils surrounding the lower ring, then bent into legs forming a nearly complete ring, the tendency of said coils being to hold the ring normally across the ring of the section, and a soft sheet across said baffle ring.

6. In a fruit picker, the combination with one section including longitudinal rods, and a ring standing in a transverse plane and attached to the extremities of the rods, the ring being split so that it may be compressed; of a second section including longitudinal rods passing outside the first ring, a ring standing in a transverse plane and encircling the first set of rods, the second ring being attached to the ends of the second set, means in the outer set of rods slightly spaced from its ring and adapted to engage with the ring of the first set when the two sections are distended, and cutting mechanism carried at the free end of one section in position to deliver thereinto.

In testimony whereof, we affix our signatures in the presence of two witnesses.

GEORGE P. FREY.
VIRGIL S. KNOPP.

Witnesses:
GEORGE W. SAUNUT,
BERNICE NOLAND.